(12) United States Patent
Schmatz et al.

(10) Patent No.: US 12,254,092 B2
(45) Date of Patent: Mar. 18, 2025

(54) ATTESTATION OF LOGIC LOADER CODE AND INTEGRITY CHECKING SERVICE LOGIC CODE IN A TRUSTED EXECUTION ENVIRONMENT (TEE)

(71) Applicant: International Business Machines Corporation, Armonk, NY (US)

(72) Inventors: Martin Schmatz, Rueschlikon (CH); Navaneeth Rameshan, Zurich (CH); Patricia M. Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 17/832,273

(22) Filed: Jun. 3, 2022

(65) Prior Publication Data
US 2023/0394150 A1    Dec. 7, 2023

(51) Int. Cl.
*G06F 21/57* (2013.01)
*G06F 21/64* (2013.01)
*H04L 9/08* (2006.01)

(52) U.S. Cl.
CPC .............. *G06F 21/57* (2013.01); *G06F 21/64* (2013.01); *H04L 9/0825* (2013.01)

(58) Field of Classification Search
CPC ......... G06F 21/57; G06F 21/64; H04L 9/0825
See application file for complete search history.

(56) References Cited

U.S. PATENT DOCUMENTS

| | | |
|---|---|---|
| 9,087,200 B2 | 7/2015 | McKeen et al. |
| 9,444,627 B2 | 9/2016 | Varadarajan et al. |
| 9,846,787 B2 | 12/2017 | Johnson et al. |
| 9,864,861 B2 | 1/2018 | Xing et al. |
| 10,511,598 B2 | 12/2019 | Shanahan et al. |
| 10,601,590 B1 * | 3/2020 | Chhabra ................. G06F 21/44 |
| 10,805,087 B1 * | 10/2020 | Allen ....................... G06F 21/57 |

(Continued)

FOREIGN PATENT DOCUMENTS

| | | | |
|---|---|---|---|
| EP | 3866036 A1 | 8/2021 | |
| WO | WO-2020177879 A1 * | 9/2020 | ............. G06F 21/53 |
| WO | WO-2023186328 A1 * | 10/2023 | |

OTHER PUBLICATIONS

International Search Report and Written Opinion from PCT Application No. PCT/EP2023/064009, dated Jul. 24, 2023.

(Continued)

*Primary Examiner* — Darshan I Dhruv
(74) *Attorney, Agent, or Firm* — Zilka Kotab, P.C.

(57) ABSTRACT

A computer-implemented method according to one embodiment includes performing an attestation of code of a logic loader in a trusted execution environment (TEE) and receiving a request for the logic loader to load service logic code to the TEE. An integrity check of the service logic code associated with the request is performed. In response to the service logic code associated with the request passing the integrity check, the logic loader is allowed to load the service logic code associated with the request to the TEE. A computer program product according to another embodiment includes a computer readable storage medium having program instructions embodied therewith. The program instructions are readable and/or executable by a computer to cause the computer to perform the foregoing method.

20 Claims, 9 Drawing Sheets

(56) References Cited

U.S. PATENT DOCUMENTS

| | | | |
|---|---|---|---|
| 10,867,030 B2 | 12/2020 | Liu | |
| 11,288,377 B1* | 3/2022 | Kopylov | G06F 9/45558 |
| 11,748,481 B1* | 9/2023 | Hamlin | G06F 21/575 |
| | | | 726/25 |
| 2012/0266167 A1* | 10/2012 | Spiers | H04L 9/3234 |
| | | | 718/1 |
| 2014/0258700 A1* | 9/2014 | England | G06F 21/572 |
| | | | 713/2 |
| 2015/0081554 A1* | 3/2015 | Wong | G06Q 20/322 |
| | | | 705/35 |
| 2017/0093803 A1* | 3/2017 | Nayshtut | H04L 63/1441 |
| 2017/0289151 A1* | 10/2017 | Shanahan | G06F 12/0875 |
| 2018/0097809 A1* | 4/2018 | Chakrabarti | H04L 67/10 |
| 2019/0243950 A1* | 8/2019 | Soriente | G06F 9/545 |
| 2020/0021445 A1* | 1/2020 | Caceres | G06F 21/44 |
| 2020/0387893 A1 | 12/2020 | Maim | |
| 2021/0014068 A1* | 1/2021 | Sandler | G06F 21/71 |
| 2021/0019393 A1 | 1/2021 | Michalevsky et al. | |
| 2021/0111892 A1* | 4/2021 | Vahldiek-Oberwagner | G06F 21/57 |
| 2021/0328787 A1 | 10/2021 | Grieder et al. | |
| 2021/0374234 A1 | 12/2021 | Bursell | |
| 2022/0006620 A1* | 1/2022 | Bursell | H04L 9/0825 |
| 2022/0019698 A1* | 1/2022 | Durham | H04L 9/0841 |
| 2022/0129591 A1* | 4/2022 | K. | G06F 21/74 |
| 2022/0156390 A1* | 5/2022 | Karame | G06F 21/606 |
| 2022/0171883 A1* | 6/2022 | Bursell | G06F 21/71 |
| 2022/0222323 A1* | 7/2022 | Naqvi | G06F 21/6245 |
| 2022/0294643 A1* | 9/2022 | Wang | H04L 9/3255 |
| 2023/0036165 A1* | 2/2023 | Bursell | G06F 21/78 |
| 2023/0068880 A1* | 3/2023 | Liu | G06F 21/53 |
| 2023/0168911 A1* | 6/2023 | Lopez Pascual | G06F 9/4401 |
| | | | 718/1 |
| 2023/0297666 A1* | 9/2023 | Atamli | G06F 21/53 |
| | | | 726/23 |
| 2023/0308277 A1* | 9/2023 | Van Cleve | H04L 63/0807 |

OTHER PUBLICATIONS

Silva et al., "DynSGX: A Privacy Preserving Toolset for Dynamically Loading Functions into Intel(R) SGX Enclaves," IEEE CloudCom, 2017, 8 pages, retrieved from https://arxiv.org/abs/1710.11423.

AWS, "How to clone an AWS CloudHSM cluster across regions," AWS Security Blog, Oct. 1, 2018, 12 pages, retrieved from https://aws.amazon.com/blogs/security/how-to-clone-an-aws-cloudhsm-cluster-across-regions/.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," National Institute of Standards and Technology, Information Technology Laboratory, Version 15, Oct. 7, 2009, pp. 1-2.

Mell et al., "The NIST Definition of Cloud Computing," Recommendations of the National Institute of Standards and Technology, Special Publication 800-145, Sep. 2011, pp. 1-7, retrieved from https://doi.org/10.6028/NIST.SP.800-145.

CSRC, "Cloud Computing," Computer Security Resource Center, Oct. 2017, 3 pages, retrieved from https://csrc.nist.gov/projects/cloud-computing.

Birkholz et al., " Remote Attestation Procedures Architecture draft-ietf-rats-architecture-15," RATS Working Group, Feb. 8, 2022, 47 pages.

* cited by examiner

ATTESTATION OF LOGIC LOADER CODE AND INTEGRITY CHECKING SERVICE LOGIC CODE IN A TRUSTED EXECUTION ENVIRONMENT (TEE)

BACKGROUND

The present invention relates to TEEs, and more specifically, this invention relates to a confidential computing framework operating securely inside a TEE.

Logic loaders are often relied on to load service logic code on an enclave in response to receiving a request for logic loader code. Logic loaders operate using logic loader code that, when included in a secure enclave, is protected from being compromised by an actor outside of the secure enclave. Once loaded, the service logic code is executed to obtain data sought in the request.

SUMMARY

A computer-implemented method according to one embodiment includes performing an attestation of code of a logic loader in a trusted execution environment (TEE) and receiving a request for the logic loader to load service logic code to the TEE. An integrity check of the service logic code associated with the request is performed. In response to the service logic code associated with the request passing the integrity check, the logic loader is allowed to load the service logic code associated with the request to the TEE.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
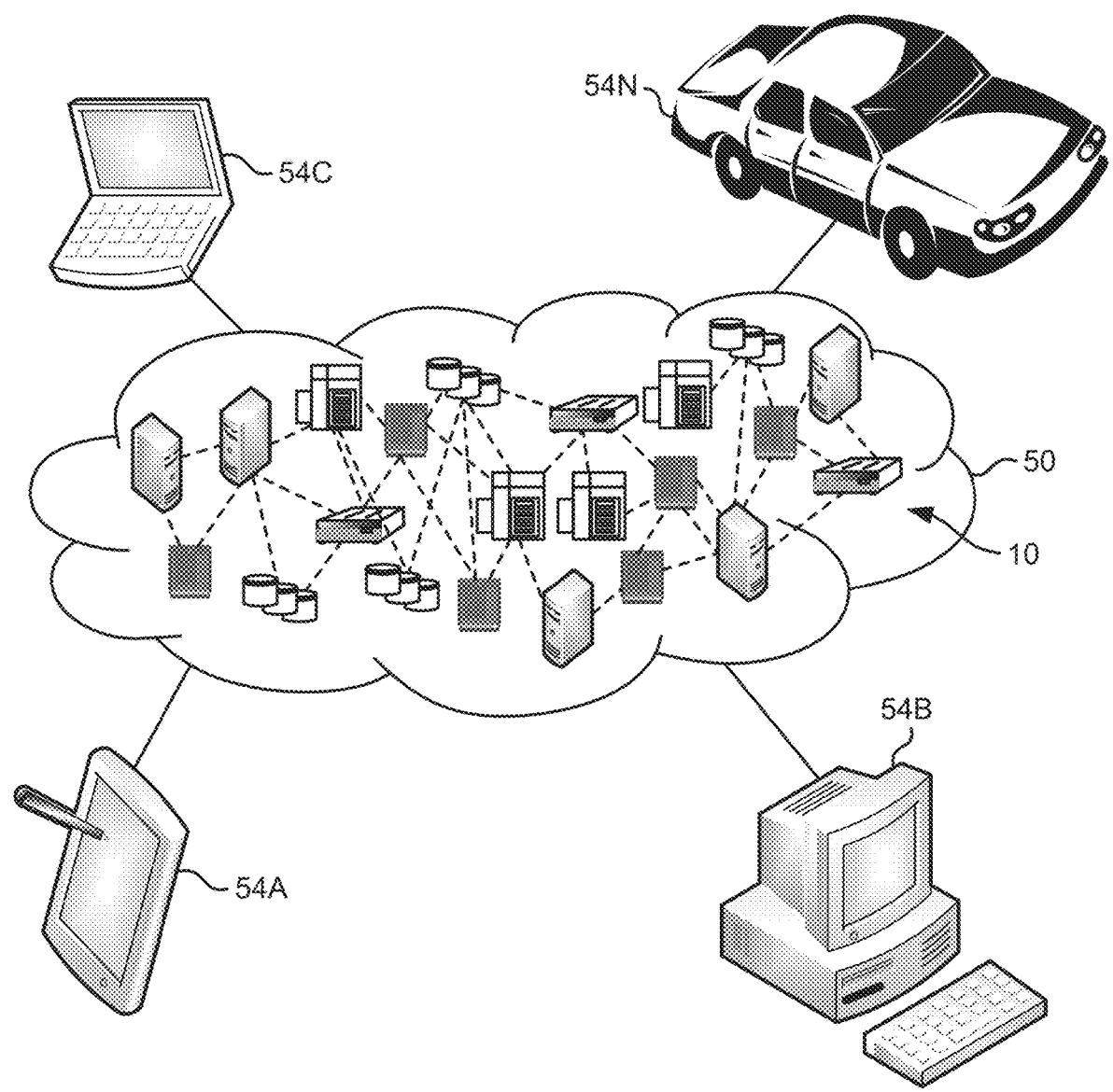
FIG. 1 depicts a cloud computing environment in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of attestation of code of a logic loader in a TEE and an integrity check of service logic code associated with a request for a logic loader to load service logic code to the TEE.

In one general embodiment, a computer-implemented method includes performing an attestation of code of a logic loader in a trusted execution environment (TEE) and receiving a request for the logic loader to load service logic code to the TEE. An integrity check of the service logic code associated with the request is performed. In response to the service logic code associated with the request passing the integrity check, the logic loader is allowed to load the service logic code associated with the request to the TEE.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
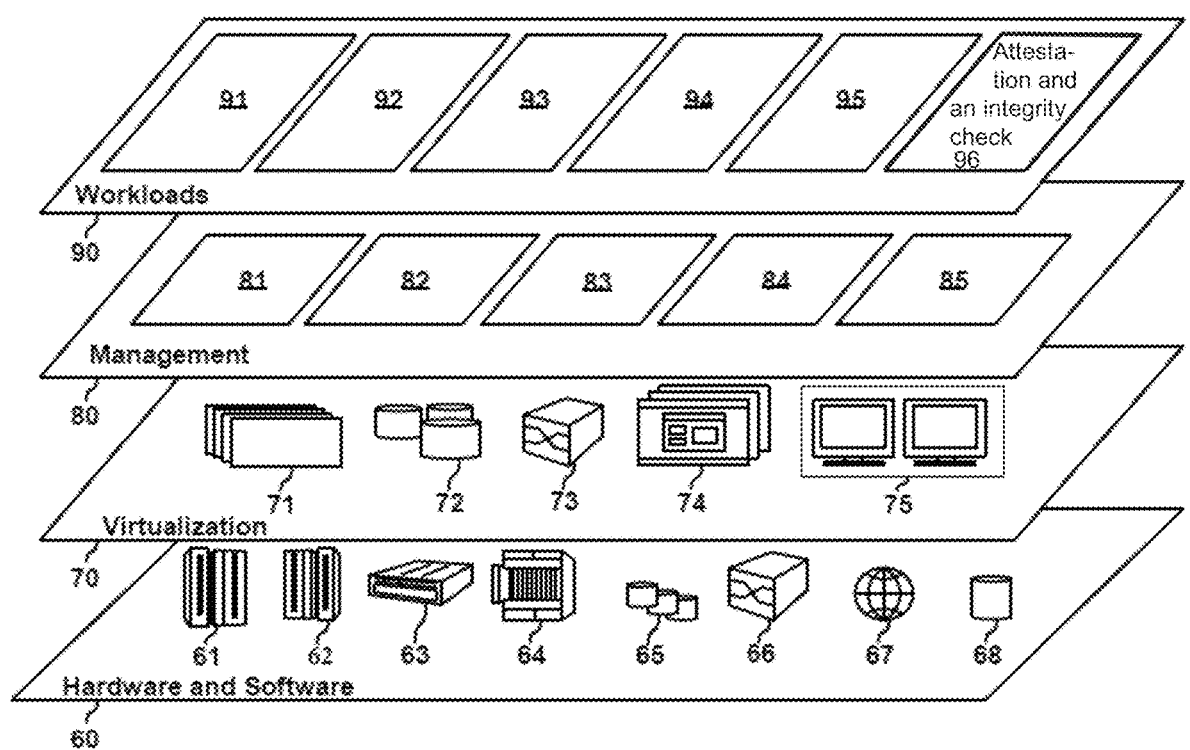
FIG. 2 depicts abstraction model layers in accordance with one embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attestation of code of a logic loader in a TEE and an integrity check of service logic code associated with a request for a logic loader to load service logic code to the TEE 96.

Figure 3:
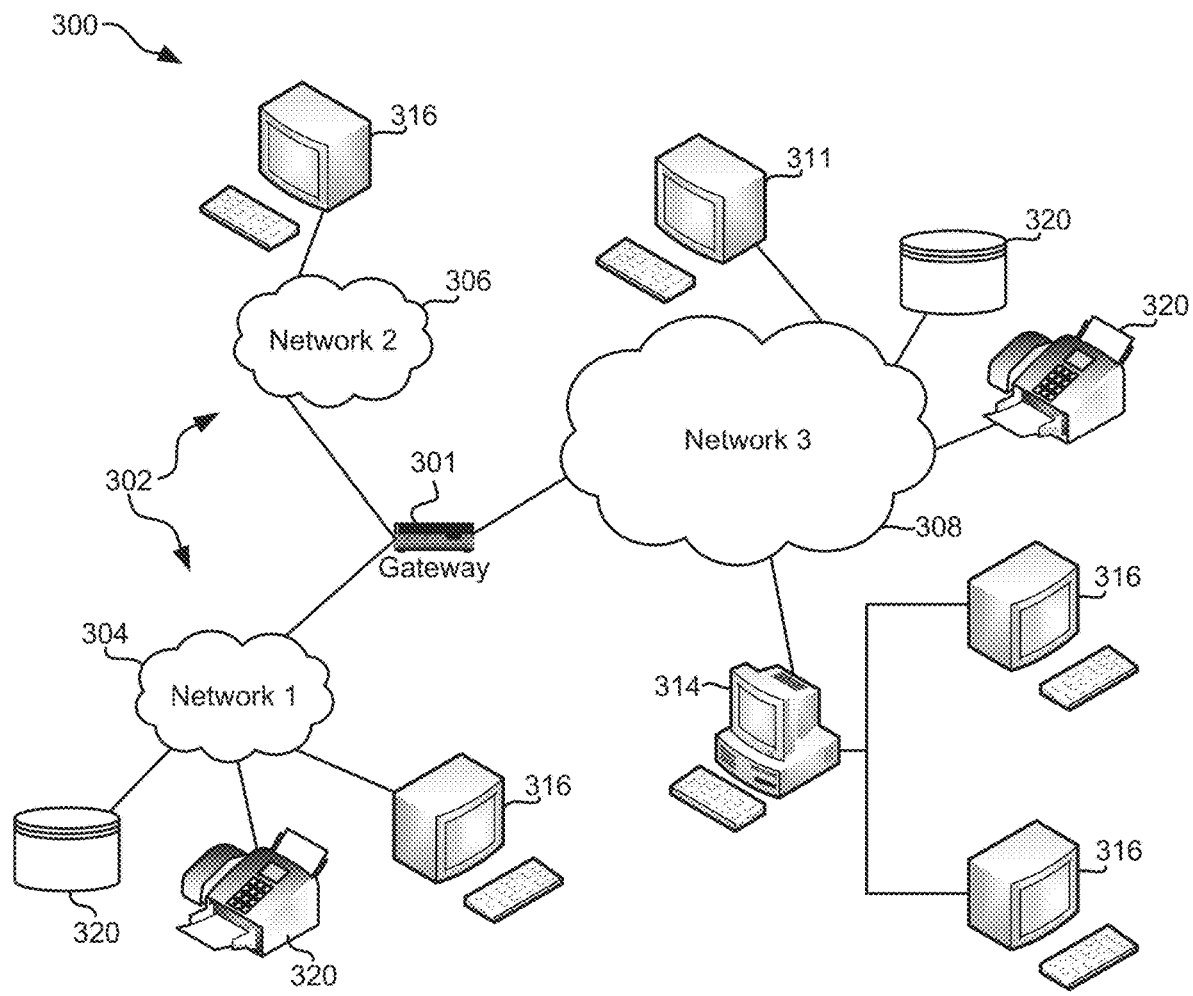
FIG. 3 is a diagram of a network architecture, in accordance with one embodiment.

FIG. 3 illustrates an architecture 300, in accordance with one embodiment. As shown in FIG. 3, a plurality of remote networks 302 are provided including a first remote network 304 and a second remote network 306. A gateway 301 may be coupled between the remote networks 302 and a proximate network 308. In the context of the present architecture 300, the networks 304, 306 may each take any form including, but not limited to a local area network (LAN), a wide area network (WAN) such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, and which is accessible from the remote networks 302 via the gateway 301. It should be noted that the data server(s) 314 may include any type of computing device/groupware. Coupled to each data server 314 is a plurality of user devices 316. User devices 316 may also be connected directly through one of the networks 304, 306, 308. Such user devices 316 may include a desktop computer, lap-top computer, hand-held computer, printer or any other type of logic. It should be noted that a user device 311 may also be directly coupled to any of the networks, in one embodiment.

A peripheral 320 or series of peripherals 320, e.g., facsimile machines, printers, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 304, 306, 308, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 4:
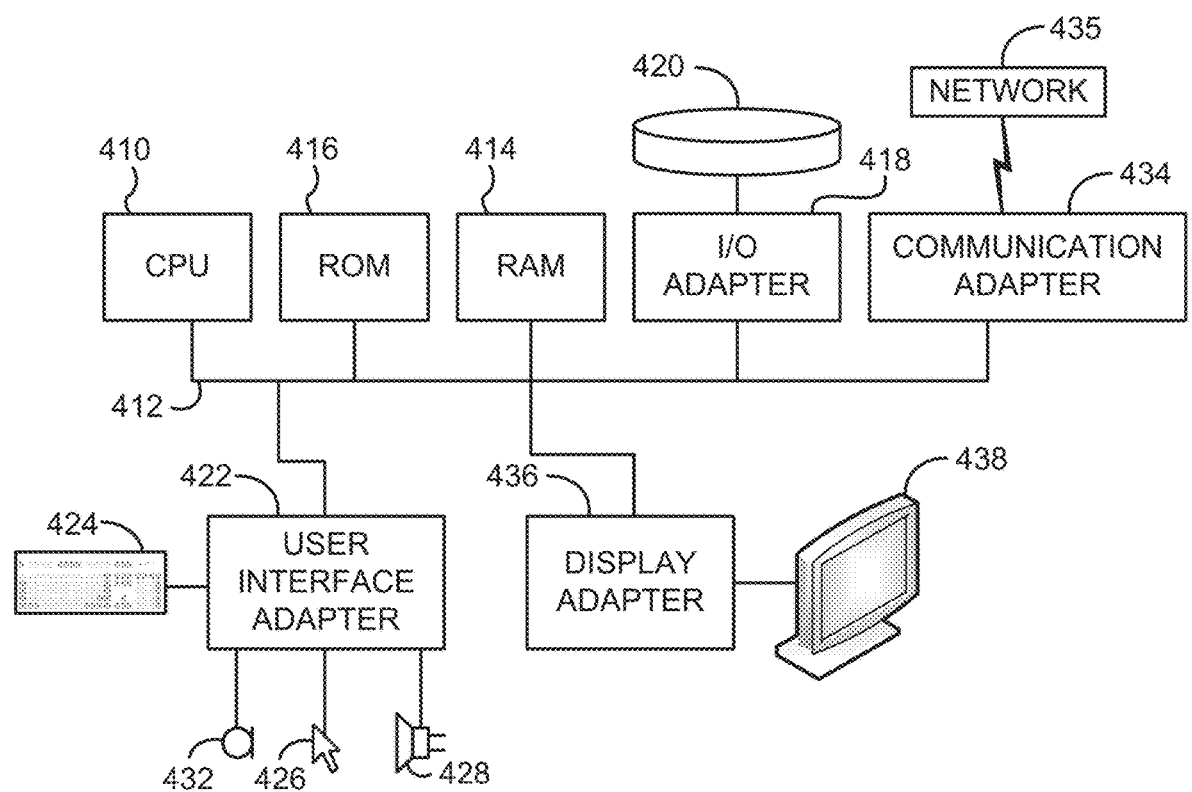
FIG. 4 is a diagram of a representative hardware environment that may be associated with the servers and/or clients of FIG. 3, in accordance with one embodiment.

FIG. 4 shows a representative hardware environment associated with a user device 316 and/or server 314 of FIG. 3, in accordance with one embodiment. Such figure illustrates a typical hardware configuration of a workstation having a central processing unit 410, such as a microprocessor, and a number of other units interconnected via a system bus 412.

The workstation shown in FIG. 4 includes a Random Access Memory (RAM) 414, Read Only Memory (ROM) 416, an input/output (I/O) adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen and a digital camera (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere herein, logic loaders are often relied on to load service logic code on an enclave in response to receiving a request for logic loader code. Logic loaders operate using logic loader code that when included in a secure enclave, is protected from being compromised by an actor outside of the secure enclave. Once loaded, the service logic code is executed to obtain data sought in the request. Conventional secure enclaves however fail to authenticate executed service logic code. These conventional enclaves instead rely on frameworks that are prone to security breach as sensitive information is left exposed in plain memory.

In sharp contrast to the deficiencies of the conventional techniques described above, the techniques of various embodiments and approaches described herein include a confidential computing framework operating securely inside a trusted execution environment TEE. The confidential computing framework offers an attestable service loader Application Programming Interface (API) executing inside the TEE. These techniques enable custom business logic code to be loaded and/or executed inside the TEE and an integrity of the business logic code is checked at load time. The business logic code may be confidential, e.g., encrypted. Furthermore, these techniques enable the business logic code to be unloaded and/or updated from the TEE. As will be described in detail elsewhere below, e.g., see method 500, an authenticity of executed code may be enforced in two steps: attestation of business logic loader code, and integrity checking of service logic code during load time.

Figure 5:
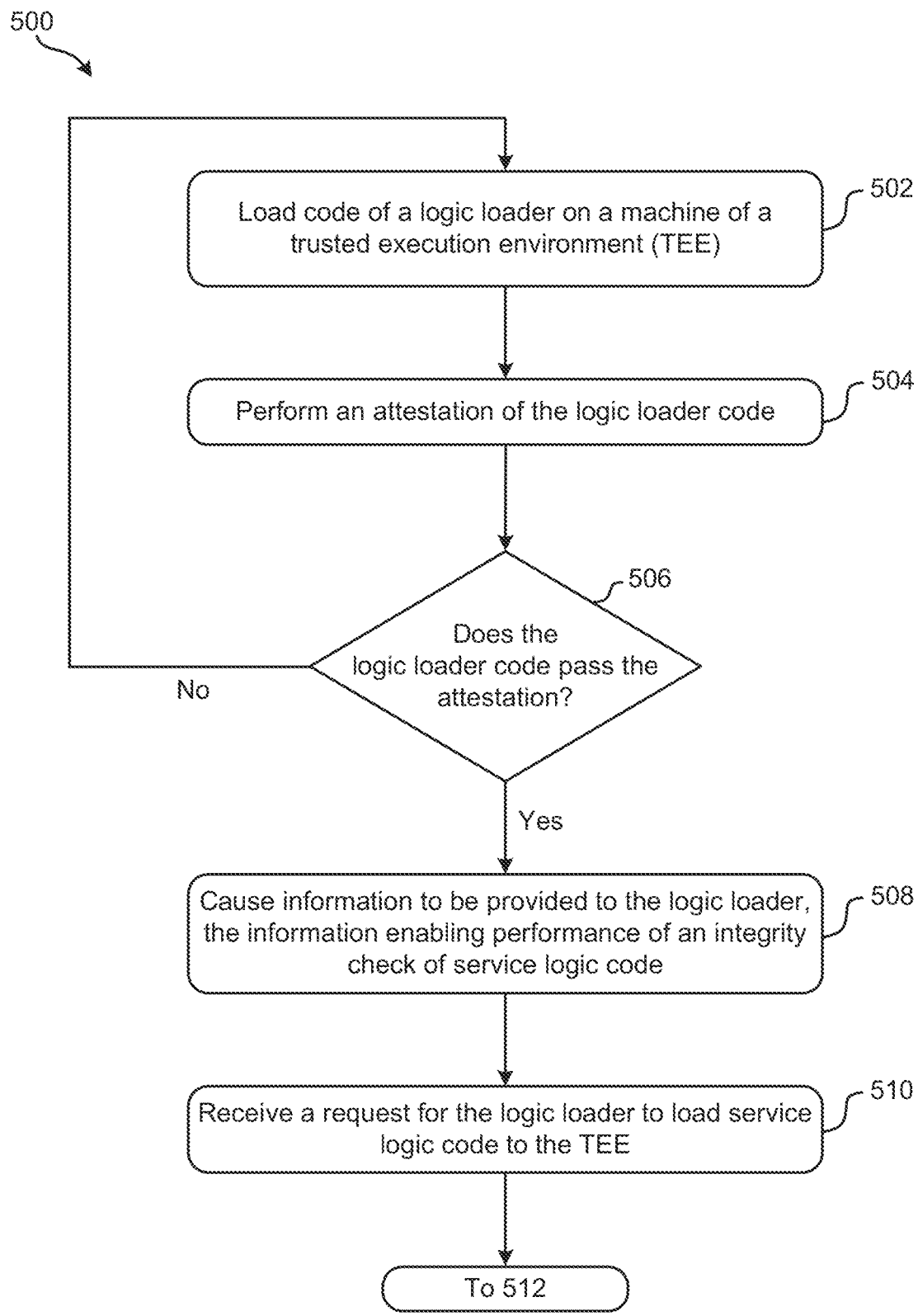
FIG. 5 is a flowchart of a method, in accordance with one embodiment.
Figure 5:
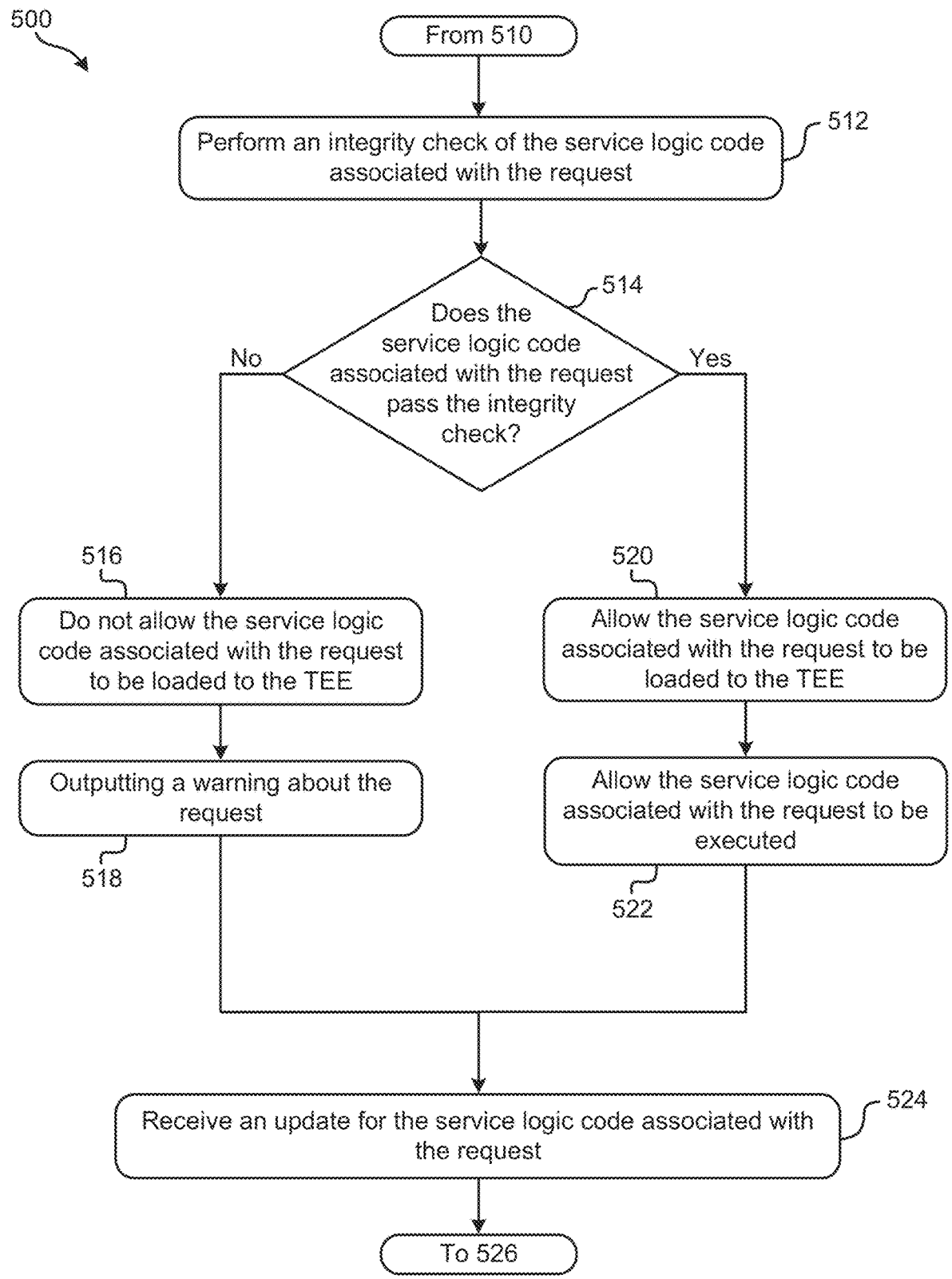
Figure 5:
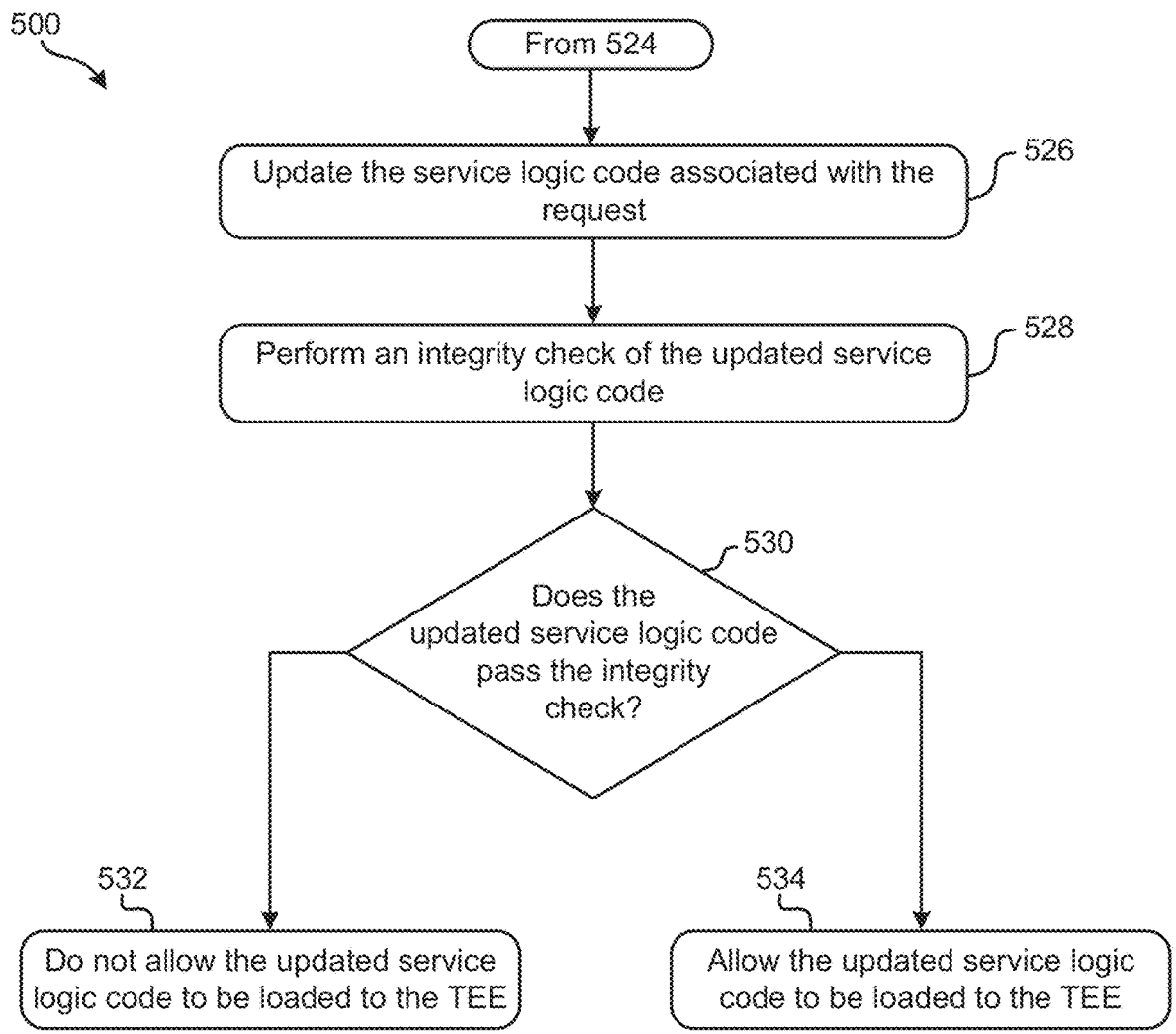

Now referring to FIG. 5, a flowchart of a method 500 is shown according to one embodiment. The method 500 may be performed in accordance with the present invention in any of the environments depicted in FIGS. 1-7, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Operation 502 of method 500 includes loading code of a logic loader on a TEE. The logic loader may in some approaches be included in a TEE that is a confidential computing framework that is configured to communicate with service logic code requests via an API. Accordingly, in some approaches, the logic loader code may be loaded on a physical machine, e.g., a computer, a processor, a controller, a display, etc., and/or a virtual machine (VM) of the TEE. More specifically, in some approaches the logic loader code may be business API code. For example, in one approach the business API code may be code used in a banking API, and be configured to load service logic code in response to receiving a request to do so. The physical machine and/or the virtual machine may be of a known type and may be configured to perform an attestation of and/or execute the logic loader code. Once the logic loader code is loaded on the TEE, the logic loader code is not accessible and not viewable from a perspective of a device that is outside the TEE.

The logic loader code is intended to be run subsequent to the logic loader code being attested. Accordingly, an attestation of the logic loader code is performed, and it is determined whether the logic loader code passes the attestation, e.g., see operations 504-506. For context, the attestation may be performed as a verification process that verifies that the logic loader is configured to perform according to parameters that the logic loader attests to. Accordingly, it may be determined that the logic loader passes the attestation in response to a determination that it is successfully verified that logic loader is configured to perform according to parameters that the logic loader attests to. Furthermore, because in some approaches operational security is a priority in the TEE, the attestation of the logic loader code is performed before the logic loader uses the logic loader code in order to ensure that the logic loader code is not fraudulent. For example, fraudulent logic loader code may be configured to cause the logic loader to submit to operating according to a first manner, e.g., a first routine, but in fact cause the logic loader to operate according to a second manner, e.g., a second routine, when executed. Techniques for performing the attestation of the logic loader code may vary depending on the approach. For example, in some approaches the attestation of the logic loader code may be a remote attestation. In some other approaches the attestation of the logic loader code may additionally and/or alternatively be performed using known attestation techniques. The attestation may additionally and/or alternatively be performed by any entity that is responsible for giving service logic to the logic loader, e.g., a service admin.

In response to a determination that the logic loader code does not pass the attestation, e.g., see "No" logical path of decision 506, the logic loader code is not allowed to be used in the TEE. The logic loader code may additionally and or alternatively be removed from the TEE in the event that the logic loader code has been loaded for attestation. In some approaches, in response to a determination that the logic loader code does not pass the remote attestation, an attestation may optionally be performed on one or more other predetermined samples of logic loader code.

In response to a determination that the logic loader code passes the attestation, e.g., see "Yes" logical path of decision 506, the logic loader code may be allowed to be used in the TEE. More specifically, once the logic loader code is attested, from a business logic point of view, the logic loader is an empty shell in the sense that the logic loader has code that allows service logic code to be loaded onto the physical machine or VM, but has not yet loaded any of such service logic code. For context, the logic loader code may be any portion of code that is configured to be executed when loaded on the TEE, e.g., the service logic code may be a standalone application, the service logic code may be business logic, the service logic code may be part of an application, the service logic code may be a program, the service logic code may be a query, etc.

Subsequent to the attestation of the logic loader code, the logic loader is configured to load service logic code onto a machine of the TEE. In one approach the machine of the TEE may be a physical machine. In another approach, the machine of the TEE may be a virtual machine (VM) of the TEE. Note that in some preferred systems, any TEE must be booted on a physical machine that has hardware support for that specific type of TEE. In some approaches, the TEE does not contain several physical machines, however, several TEEs may be booted concurrently on a physical machine.

In order for service logic code to be allowed to be loaded onto the machine of the TEE, an integrity check is preferably performed on service logic code associated with any requests that are received for loading service logic code on the machine of the TEE. Note that for some approaches in which the machine is a physical machine, the physical machine may be enhanced with TEE technology, e.g., SOFTWARE GUARD EXTENSIONS (SGX), ARM SEV, TRUSTZONE, etc. Moreover, the TEE may need to be booted/established on the physical machine. In order to configure the logic loader for performing an integrity check at loading, method 500 includes causing information to be provided to the logic loader, e.g., see operation 508. The information preferably enables performance of an integrity check of service logic code and indicates how to determine whether service logic code should be trusted and run in the TEE. For example, in some approaches the information includes a type of fingerprint of expected service logic that the logic loader is to run or execute. In another approach, the information may additionally and/or alternatively include authenticated encryption information. Although some other types of authentication are described herein as being implemented via an asymmetric key pair and/or a SHA fingerprint, authenticated symmetric encryption, e.g., AES-GCM and/or secret injection of a key to an enclave may additionally and/or alternatively be implemented in some approaches. In another approach, the information may additionally and/or alternatively include at least one encryption key, e.g., a public encryption key, a private encryption key, etc. The information including at least one encryption key may enable decryption to be performed in the event that service logic code associated with a request for loading service logic code is encrypted. Once decrypted, an integrity check of the service logic code may be performed. In some approaches the information additionally and/or alternatively includes instructions detailing how to perform execution of service logic code. For example, the information may include an instruction to load and execute service logic code associated with a request one time in response to a determination that the service logic code passes the integrity check. In contrast, the information may include an instruction to load and execute service logic code associated with a request a plurality of times in response to a determination that the service logic code passes the integrity check. In some other approaches the information may include an instruction to immediately load and execute service logic code associated with a request, execute service logic code at a predetermined start-up time and keep the service logic code persistently available, update a confidential computing microservice, e.g., hereafter "u-service," in response to a determination that the confidential computing u-service is up and running, etc. In addition to the various examples of encryption technologies described herein, known types of encryption techniques, information, parameters, values, etc., may be adapted for use in various embodiments, as would become apparent to one skilled in the art upon reading the present disclosure.

It should be noted that the type of instructions that are included in the information may in some approaches depend on a type of service and/or business logic that is anticipated being delivered to the logic loader for loading. Assuming for purposes of an example that the type of service and/or business logic that is anticipated being delivered to the logic loader for loading is banking related, in some approaches the information may include an instruction to load and only execute logic a single time before requiring reauthentication of a user profile. In another approach, assuming that the type of service and/or business logic that is related to location services, the service information may include an instruction ongoingly execute the service logic code in order to maintain updated location results obtained from executing the service logic code.

Operation 510 includes receiving a request for the logic loader to load, and in some approaches, execute service logic code to the TEE. The request is in some approaches received from one or more locations outside of the TEE. One or more of the requests may be stored in a queue until being fulfilled. In some approaches the request is received via an API that exists between the TEE and a location outside of the TEE, e.g., a cloud location using a predetermined service mesh that exists between the TEE and the cloud location, a processing location that is in communication with one or more user devices, a user device, a service administrator device that manages a request platform, etc.

An integrity check of the service logic code associated with the request is performed, e.g., see operation 512. In one approach, performing the integrity checks includes performing a simple hash comparison. In another approach, performing the integrity checks may additionally and/or alternatively include performing Trusted Platform Module (TPM) based measurements and attestation. Any form of third party attestation/remote attestation may additionally and/or alternatively be performed for the integrity check. In yet another approach, signature checking of the loaded code may additionally and/or alternatively be also used as the integrity check.

In some approaches integrity check is performed by the service loader at a load time, during which the service loader applied the information provided to the service loader for enabling performance of the integrity check of the service logic code associated with the request. Note that at the load time, the service logic code may be loaded on a testing platform of the TEE, but not yet on an execution platform of the TEE until the service logic passes an integrity check. In some approaches the integrity check may specifically be performed in response to receiving a request to load service logic code. The integrity check may additionally and/or alternatively be performed prior to receiving a request to load service logic code, e.g., such as for at least one of a predetermined collection of service logic codes that may be requested.

In some approaches, the integrity check is only performed on the service logic code subsequent to a verification being performed for verifying that the request is received from a trustworthy service administrator device. This verification may provide an additional measure of security within the TEE provided that the service administrator device is a trusted device. This is because by opting to only process requests from a trusted device such as the trustworthy service administrator device, the request from a fraudulent source is less likely to be processed within the TEE. Accordingly, in some approaches method 500 includes performing attestation for determining whether the request is received from a trustworthy service administrator device. In some approaches, known techniques for performing remote attestation may be used. In some other approaches, techniques for determining whether the request is received from a trustworthy service administrator device include local attestation, e.g., if the service administrator is on the same physical device with the TEE. Remote attestation is in general not used to determine whether a specific request comes from a certain or dedicated device. In contrast, remote attestation may be used to determine if the service administrator device is trustworthy. Accordingly, the integrity of the device or code or business/service logic may be checked. In some approaches, to ensure that the request comes from a certain service administrator device an authentication, e.g., via keys, may be performed.

In response to a determination that the request is received from the trustworthy service administrator device, performance of the integrity check of the service logic code associated with the request is allowed. In contrast, in response to a determination that the request is not received from the trustworthy service administrator device, performance of the integrity check of the service logic code associated with the request is not allowed.

In response to a determination that the service logic code associated with the request does not pass the integrity check, e.g., as illustrated by the "No" logical path of decision 514, the logic loader is caused to not load and/or not execute the service logic code associated with the request to the TEE, e.g., see operation 516. A warning about the request may additionally and/or alternatively be output in response to the determination that the service logic code associated with the request does not pass the integrity check, e.g., see operation 518. For example, the warning may indicate that the request and/or a source of the request is untrustworthy. The warning may be output to one or more destination devices, e.g., a device used by a service administrator, the requesting device, with execution instructions to a device configured to execute a predetermined security protocol on the TEE for ensuring that the TEE has not been compromised by a known type of fraudulent actor, etc. In contrast, in response to the service logic code associated with the request passing the integrity check, e.g., as illustrated by the "Yes" logical path of decision 514, the logic loader is allowed to load the service logic code associated with the request to the TEE, e.g., see operation 520. According to various approaches, the logic loader may be allowed to load the service logic code associated with the request to the TEE, e.g., in response to receiving a command from a controller of the TEE, in response to receiving an instruction from an administrator device, in response to a warning not being output to an administrator device as a result of the integrity check being performed, etc.

The service logic code associated with the request is allowed to be executed in response to the request being loaded to the TEE, e.g., see operation 522. Execution of the service logic code may include requesting access to and/or accessing information stored on a storage device, e.g., such as a cloud service, a local storage device, a plurality of storage devices that are both local on the TEE as well as not local on the TEE, etc., in order to fulfill the request. For example, the information may include, e.g., bank branch location information, bank account information for a user associated with the request, location information, ledger information, text strings, etc., that is requested in the request. Subsequent to the execution of the service logic code, the service logic code may be unloaded, e.g., deleted. In some other approaches, at least a portion of the service logic code may be stored on a physical device of the TEE for later potential use. Note that in some approaches in which at least a portion of the service logic code may be stored on a physical device of the TEE, the at least a portion of the service logic code may be optionally not allowed to be executed until a request for executing the service logic code is received and/or at least the portion of the service logic code again passes an integrity check.

An update may be received for the service logic code associated with the request and the service logic code associated with the request may optionally be updated, e.g., see operations 524-526. In some approaches an update for the service logic code associated with the request is received subsequent to the integrity check being performed. In order to ensure that the update does render the updated service logic code to a state that is capable of harming the TEE, e.g., such as where the update adds a fraudulent segment of code to the service logic code, an integrity check may be performed on the updated service logic code prior to the updated service logic code being loaded to and/or executed by the TEE, e.g., see operation 528. Techniques described elsewhere herein for performing an integrity check, e.g., see operation 512, may be relied on for performing an integrity check on the updated service logic code. Note that in some approaches, updating the service logic code associated with the request may include uploading the service logic code from the TEE.

It may be determined whether the updated service logic code passes the integrity check, e.g., see decision 530. In response to a determination that the updated service logic code does not pass the integrity check, e.g., as illustrated by the "No" logical path of decision 530, the updated service logic code is not allowed to be loaded on the TEE and/or executed on the TEE, e.g., see operation 532. In contrast, in response to a determination that the updated service logic code passes the integrity check, e.g., as illustrated by the "Yes" logical path of decision 530, the updated service logic code is allowed to be loaded on the TEE and/or executed on the TEE, e.g., see operation 534.

Maintaining a TEE by authenticating executed code using the techniques described herein has heretofore not been considered. More specifically, conventional techniques fail to authenticate executed code by utilizing attestation of business logic loader code and integrity checking service logic code during load time. In sharp contrast, these conventional techniques rely on frameworks that are prone to security breach as sensitive information is left exposed in plain memory. Accordingly, the inventive discoveries disclosed herein that enable a TEE by authenticating executed code proceed contrary to conventional wisdom. This is beneficial in that the techniques described herein enable a sizable number of identifiable use cases. For example, one potential use case includes a roaming user securely loading geo-specific service logic. Another potential use case includes securely loading and executing context-aware service logic. An additional use case includes platforms such as Quantum-Safe Crypto (QSC) channel extension, e.g., for CLOUDFLARE. Secure key caching, e.g., for IBM's COS and/or data encryption/decryption software development kits (SDK) are further use cases. Yet another potential use cases includes IP-based access filtering & privacy, e.g., such as for IBM's KeyProtect. It is also important to note that an identical framework may be used inside and outside of an enclave in some approaches.

Figure 6:
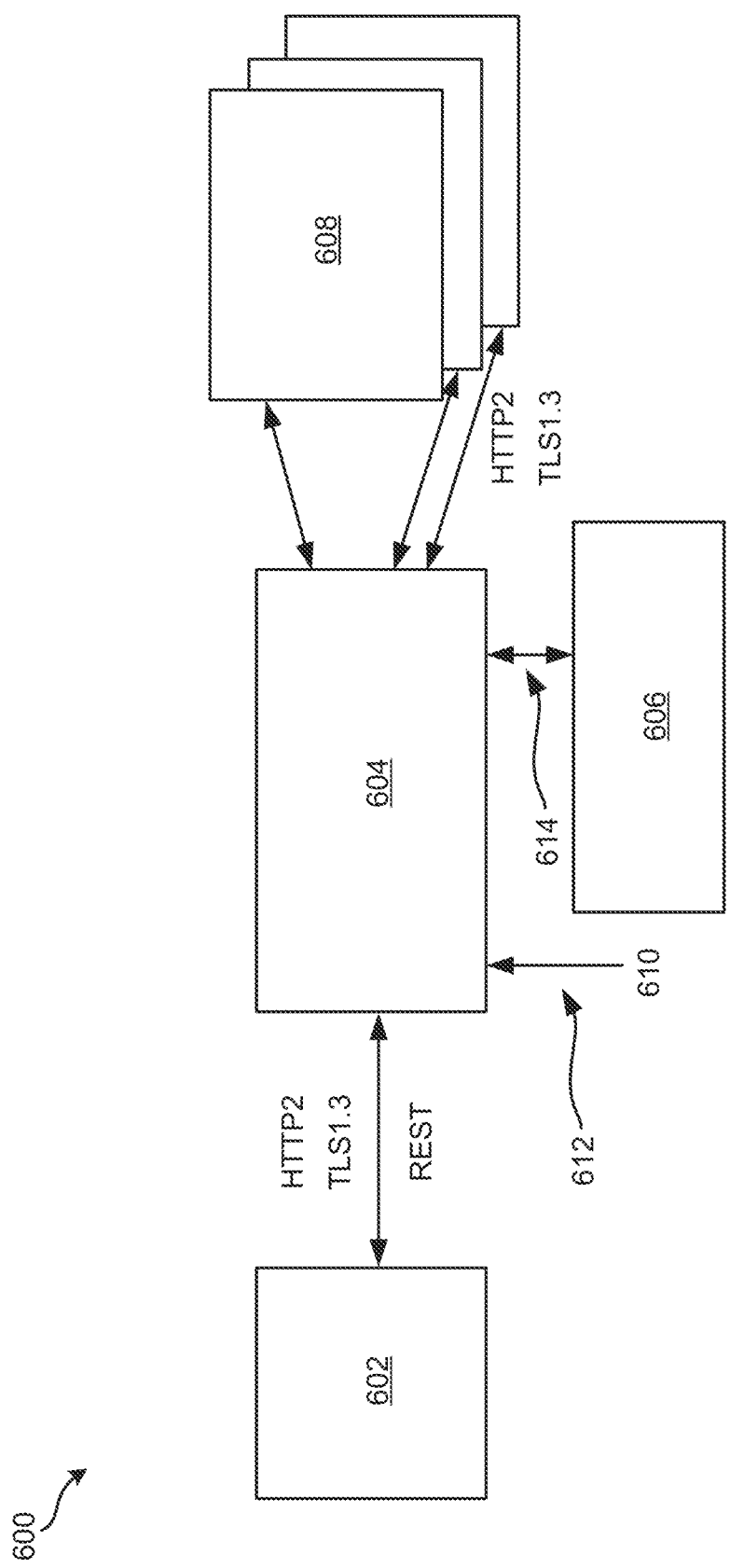
FIG. 6 is a system having a TEE, in accordance with one embodiment.

FIG. 6 depicts a system 600, in accordance with one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system 600 presented herein may be used in any desired environment.

It may be prefaced that the system 600 acts as a dynamically extensible confidential computing environment framework using a TEE 604. A primary goal of operations performed in the system 600 may include seamlessly protecting dynamic service logic using the TEE. As will be described in further detail below, the system 600 offers computing security in that dynamic service logic is attested at load time, and the loader is attested at boot time. Various embodiments and approaches described herein benefit from adding an attestable service logic loader (which may additionally and/or alternatively function as an executor of the service logic code) to the framework. Furthermore, an interface of the system 600 supports initially HTTP 1.0/2.0 with TLS 1.3 (server and client), Representational State Transfer (REST) which is an API that complies to a specific software architectural style used for Internet/Cloud applications, and a modern open source high performance remote procedure call (RPC) framework such as GOOGLE Remote Procedure Call (gRPC).

This framework provides ease of use in that application developers may focus only on the service logic, rather than the cumbersome setup of the confidential computing framework.

With continued reference to system 600, TEE 604 is in one approach a confidential computing framework, e.g., such as a u-service, which is configured to receive requests for service logic code 606. The TEE 604 may additionally and/or alternatively be a microservice, an application, a database, etc., that is protected in that code is run within a protected hardware enclave of the TEE 604 and/or a secure service container. The requests 612 may originate from a cloud service or client device 602 that is a service consumer that is in communication with the TEE via a known type of network connection. The request may be received via an API in some approaches. Within the TEE 604 of system 600, an attestation of code of a logic loader may be performed.

Using code of the logic loader and/or information provided to the logic loader, the logic loader is configured to perform secure dynamic loading 614 of service logic code 606, e.g., such as in response to receiving a request for the logic loader to load service logic code 606 to the TEE 604. An integrity check of the service logic code 606 associated with the request is preferably performed, and in response to the service logic code 606 associated with the request passing the integrity check, the logic loader is allowed to load the service logic code 606 associated with the request to the TEE 604. In some approaches, execution of the service logic code includes accessing information stored on a cloud service 608. The service logic code may be unloaded subsequent to being executed.

In one illustrative approach, the service logic code 606 may be an application that is requested to be run in the TEE 604. The application may include some binaries and some configuration files combined in a package, e.g., such as an image in a Kubernetes cluster. Such an image may in one example be measured by obtaining a SHA-256 fingerprint of all the bits that are in the image. Note that in some approaches, one or more other cryptographic hash functions may additionally and/or alternatively be used, e.g., SHA-1, SHA-512, SHA3-512, etc. This may be prepared offline such that when the service logic is being prepared, the SHA-256 fingerprint may be generated and a service admin device 610 may inform the confidential computing service of the TEE 604 that a service logic code having the SHA-256 fingerprint may be allowed to be executed, e.g., run. Accordingly, the system 600 is dynamic because loading may occur at any point in time and in particular, loading may occur dependent on a current state of the application or on a predetermined startup configuration. This is because a request may come and service logic code may be requested to be run for an application "A" associated with the request, and in the event that another request is received, service logic code associated with the second request may be run using an application "B." The system 600 is also extensible in that other service logic code may be loaded in response to a different SHA-fingerprint.

Figure 7:
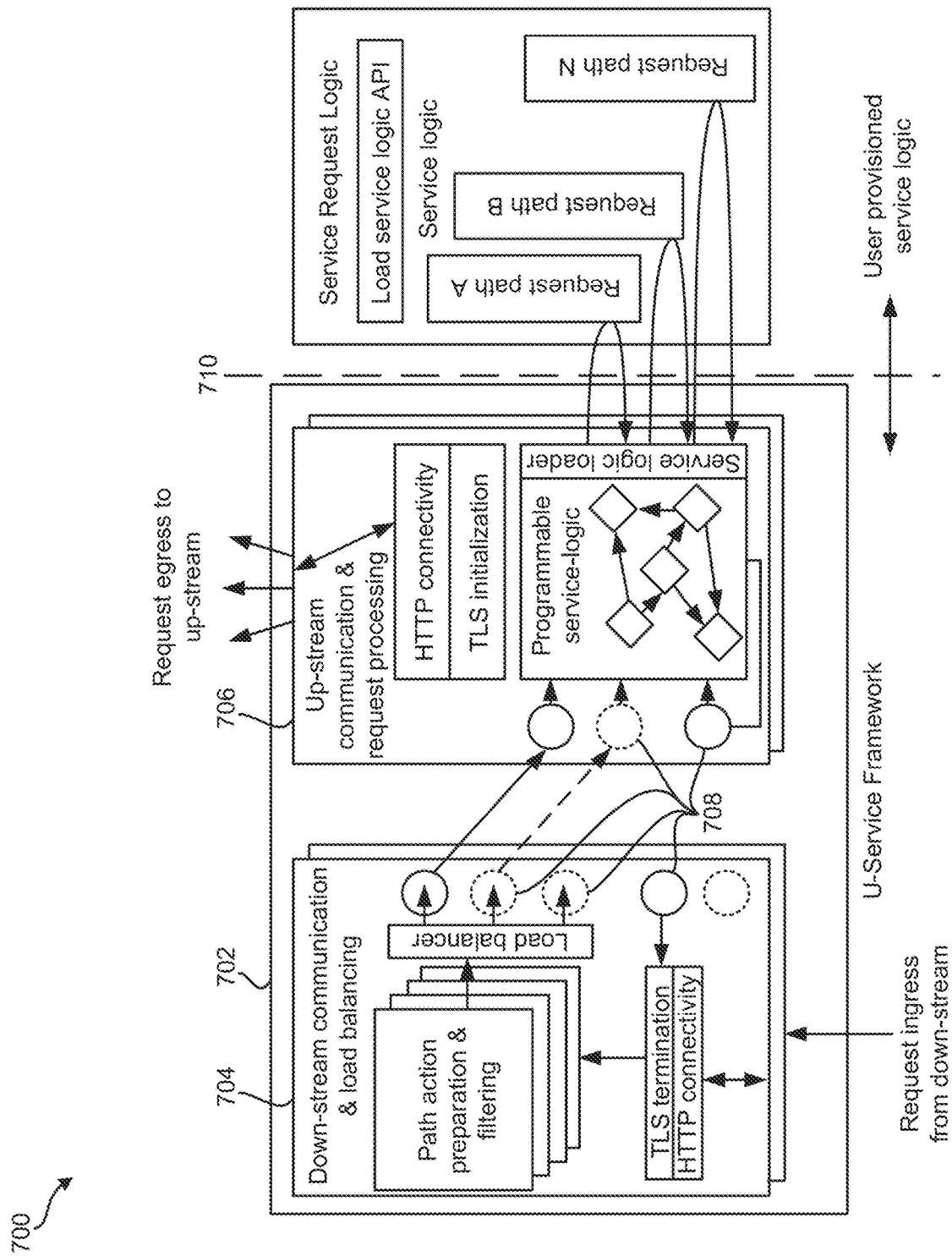
FIG. 7 is a system having a TEE, in accordance with one embodiment.

FIG. 7 depicts a system 700, in accordance with one embodiment. As an option, the present system 700 may be implemented in conjunction with features from any other embodiment listed herein, such as those described with reference to the other FIGS. Of course, however, such system 700 and others presented herein may be used in various applications and/or in permutations which may or may not be specifically described in the illustrative embodiments listed herein. Further, the system 700 presented herein may be used in any desired environment.

System 700 includes a TEE 702. Requests for a logic loader to load service logic code are received at a load balancing portion 704 of the TEE 702, e.g., see Request ingress from down-stream. The request may in one approach be received from a downstream web server or a downstream microservice. A u-service framework of the TEE 702 may be in communication with a cloud service (not shown) and/or a collection of service request logic, e.g., see Service Request Logic. The request is delivered to a processing portion 706 of the TEE 702 from the load balancing portion 704 of the TEE 702 along lock-free ring buffers 708. The processing portion 706 of the TEE 702 includes a service logic loader that once successfully attested, is configured to performing an integrity check, e.g., over an API 710. of the service logic code associated received requests. An integrity check of service logic code, e.g., see Request path A, Request path B, Request path N, etc., associated with the request may be performed at loading of the service logic code by the service logic loader. In response to the service logic code associated with the request passing the integrity check, the logic loader is allowed to load and/or execute the service logic code associated with the request to the TEE. In response to the service logic code associated with the request not passing the integrity check, the logic loader is not allowed to load and/or execute the service logic code associated with the request to the TEE.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    loading Application Programming Interface (API) code of a logic loader on a trusted execution environment (TEE);
    performing an attestation of the logic loader API code, wherein the attestation is performed within the TEE;
    receiving a request for the logic loader to load service logic code to the TEE;
    in response to a determination that the logic loader API code passes attestation, performing an integrity check of the service logic code associated with the request; and
    in response to the service logic code associated with the request passing the integrity check, allowing the logic loader to load the service logic code associated with the request to the TEE.

2. The computer-implemented method of claim 1, comprising:
causing information to be provided to the logic loader, the information enabling performance of the integrity check of the service logic code.

3. The computer-implemented method of claim 2, wherein the service logic code associated with the request is encrypted, wherein the information enables decryption of the service logic code in order for the integrity check of the service logic code to be performed, wherein the logic loader API code is configured to, when executed, cause loading of the service logic code.

4. The computer-implemented method of claim 2, wherein the information is selected from the group consisting of: a fingerprint, a public encryption key, authenticated encryption information, and a private encryption key.

5. The computer-implemented method of claim 1, comprising: allowing the service logic code associated with the request to be executed in response to the request being loaded to the TEE, wherein execution of the service logic code includes accessing information stored on a cloud service; and unloading the service logic code subsequent to the execution.

6. The computer-implemented method of claim 1, comprising:
in response to the service logic code associated with the request not passing the integrity check, causing the logic loader to not load the service logic code associated with the request to the TEE; and
outputting a warning about the request,
wherein the warning specifies to execute a predetermined security protocol on the TEE for ensuring that the TEE has not been compromised by a fraudulent actor.

7. The computer-implemented method of claim 1, comprising:
receiving an update for the service logic code associated with the request subsequent to the integrity check being performed;
updating the service logic code associated with the request; and
performing a subsequent integrity check on the updated service logic code prior to the updated service logic code being loaded to the TEE.

8. The computer-implemented method of claim 1, comprising:
performing remote attestation for determining whether the request is received from a trustworthy service administrator device;
in response to a determination that the request is received from the trustworthy service administrator device, allowing performance of the integrity check of the service logic code associated with the request; and
in response to a determination that the request is not received from the trustworthy service administrator device, not allowing performance of the integrity check of the service logic code associated with the request.

9. A computer program product, the computer program product comprising a computer readable storage medium having program instructions embodied therewith, the program instructions readable and/or executable by a computer to cause the computer to:
load Application Programming Interface (API) code of a logic loader on a trusted execution environment (TEE);
perform, by the computer, an attestation of the logic loader API code, wherein the attestation is performed within the TEE;
receive, by the computer, a request for the logic loader to load service logic code to the TEE;
in response to a determination that the logic loader API code passes attestation, perform, by the computer, an integrity check of the service logic code associated with the request; and
in response to the service logic code associated with the request passing the integrity check, allow, by the computer, the logic loader to load the service logic code associated with the request to the TEE.

10. The computer program product of claim 9, the program instructions readable and/or executable by the computer to cause the computer to:
cause, by the computer, information to be provided to the logic loader, the information enabling performance of the integrity check of the service logic code.

11. The computer program product of claim 10, wherein the service logic code associated with the request is encrypted, wherein the information enables decryption of the service logic code in order for the integrity check of the service logic code to be performed, wherein the logic loader API code is configured to, when executed, cause loading of the service logic code.

12. The computer program product of claim 10, wherein the information is selected from the group consisting of: a fingerprint, a public encryption key, authenticated encryption information, and a private encryption key.

13. The computer program product of claim 9, the program instructions readable and/or executable by the computer to cause the computer to: allow, by the computer, the service logic code associated with the request to be executed in response to the request being loaded to the TEE, wherein execution of the service logic code includes accessing information stored on a cloud service; and unload, by the computer, the service logic code subsequent to the execution.

14. The computer program product of claim 9, the program instructions readable and/or executable by the computer to cause the computer to:
in response to the service logic code associated with the request not passing the integrity check, cause, by the computer, the logic loader to not load the service logic code associated with the request to the TEE; and
output, by the computer, a warning about the request,
wherein the warning specifies to execute a predetermined security protocol on the TEE for ensuring that the TEE has not been compromised by a fraudulent actor.

15. The computer program product of claim 9, the program instructions readable and/or executable by the computer to cause the computer to:
receive, by the computer, an update for the service logic code associated with the request subsequent to the integrity check being performed;
update, by the computer, the service logic code associated with the request; and
perform, by the computer, a subsequent integrity check on the updated service logic code prior to the updated service logic code being loaded to the TEE.

16. The computer program product of claim 9, the program instructions readable and/or executable by the computer to cause the computer to:
perform, by the computer, remote attestation for determining whether the request is received from a trustworthy service administrator device;
in response to a determination that the request is received from the trustworthy service administrator device, allow, by the computer, performance of the integrity check of the service logic code associated with the request; and in response to a determination that the request is not received from the trustworthy service administrator device, not allow, by the computer, performance of the integrity check of the service logic code associated with the request.

17. A system, comprising:

a hardware processor; and logic integrated with the hardware processor, executable by the hardware processor, or integrated with and executable by the hardware processor, the logic being configured to:

load Application Programming Interface (API) code of a logic loader on a trusted execution environment (TEE);

perform an attestation of the logic loader API code, wherein the attestation is performed within the TEE;

receive a request for the logic loader to load service logic code to the TEE;

in response to a determination that the logic loader API code passes attestation, perform an integrity check of the service logic code associated with the request; and in response to the service logic code associated with the request passing the integrity check, allow the logic loader to load the service logic code associated with the request to the TEE.

18. The system of claim 17, the logic being configured to:
cause information to be provided to the logic loader, the information enabling performance of the integrity check of the service logic code.

19. The system of claim 17, the logic being configured to:
allow the service logic code associated with the request to be executed in response to the request being loaded to the TEE, wherein execution of the service logic code includes accessing information stored on a cloud service; and unload the service logic code subsequent to the execution.

20. The system of claim 17, the logic being configured to:
in response to the service logic code associated with the request not passing the integrity check, cause the logic loader to not load the service logic code associated with the request to the TEE; and output a warning about the request, wherein the warning specifies to execute a predetermined security protocol on the TEE for ensuring that the TEE has not been compromised by a fraudulent actor.

* * * * *